Patented Aug. 15, 1933

1,922,416

UNITED STATES PATENT OFFICE 1,922,416

GAS ABSORBENT

David Julian Block, Chicago, Ill.

No Drawing. Application August 5, 1931
Serial No. 555,367

5 Claims. (Cl. 252—2.5)

This invention relates to a composition of matter and a process of manufacturing the same, and more particularly to an absorption apparatus for use in connection with the absorption of odors, vapors and gases from the food compartments of refrigerators and the like.

It is known that all solids tend to absorb, or condense upon their surface, any gases or vapors with which they are in contact; especially is the solid is in an extremely subdivided phase, where the surface is very large relative to the mass. The amount of absorption for given conditions of pressure and temperature varies through rather wide limits, dependent upon the nature and physical state of the solid, and the nature of the gas. With the same solid and the same gas, the absorption is greater the higher the pressure of the gas and the lower the temperature, but ultimately the absorbent tends to become saturated whereupon the rate of absorption is gradually reduced and finally ceases entirely.

Various charcoals absorb from approximately 100 to 300 volumes of gas and as the result of my experiments I find that mixtures of various absorbent materials will absorb a greater quantity of gas than the additive absorption of the individual ingredients. For example, I have found that among the charcoals, the sour cherry (Prunes Cerasus) will absorb 280.11 cc of air per cc of charcoal, coconut (Cocus Nucifera) will absorb 251.80 cc per cc of charcoal and the common boxwood (Boxus Sempervirens) will absorb 138.50 cc per cc of charcoal, while a mixture of equal parts of sour cherry, coconut and boxwood charcoals, under identical conditions of temperature and pressure, will absorb 327.20 cc per cc of the mixed charcoals, though the calculated absorption should be but 223.47 cc of air per cc of mixed absorbents.

As a further result of my experiments, I find that when a cleansing or scavenger gas is brought in contact with a gas-saturated absorbent, inert compounds are formed insitu, whereupon further volumes of gas may then be absorbed by the absorbing medium.

It is an object of this invention to provide an absorption apparatus having no mechanically actuated parts and designed to withdraw gases, vapors, odors or volatile emanations from the air by means of the physical or physico-chemical functions of the absorbent within the device, such as fuller's earth, silica gel, pumice, charcoal, trioxymethylene, paraformaldehyde or almost any material where the solid is in an extremely subdivided phase and has a very large surface relative to its mass. All such substances tend to adsorb upon their surface, or absorb within their interstices, practically all gases and vapors, and I am aware that various devices embodying such absorptive compounds have been known and used in the prior art. My invention differs from these in that these known compounds ultimately become saturated and incapable of further absorption, whereas my invention provides for the automatic and simultaneous release, at atmospheric temperature and pressure, of gas or gases capable of neutralizing, condensing or rendering substantially odorless the absorbed, or adsorbed, vapors in situ and within the interstices of the mass, thus permitting the further ingress of volatile emanations, gases or odors and enabling the apparatus to function over prolonged periods, without becoming saturated.

Other and further important objects of this invention will be apparent from disclosures in the following description, which set forth the preferred form of my invention.

It is known that coconut-shell charcoal has the greatest absorbing power for ammonia, fustic charcoal for carbon dioxide, ebony charcoal for cyanagen, etc. We find that such odors as normally occur in refrigerators are best absorbed by a mixture of 45% sour cherry charcoal, 25% coconut charcoal and 20% boxwood charcoal, in the presence of formic aldehyde. This is probably due to the fact that the various odors, additional to being absorbed by the mixed chars, are also converted into odorless substances and, while the mechanism of this reaction is not fully understood, it is probable that the following is a fair example of the action that takes place.

It is generally known that the characteristic odor and flavor of fish and many other sea foods is due, essentially, to mixtures of alkyl amines; these odors are strongly absorbed by a mixture of activated coconut charcoal, sour cherry charcoal and boxwood charcoal, but when approximately 128 volumes of gas have been absorbed, the absorbing media becomes saturated and further absorption of these odiferous bodies ceases. If now, a reducing substance, such as formic aldehyde, be passed through the absorbing mass, the alkyl amines are reduced to odorless hexamethylenetetramine and alkyl vapors, and the mixed carbons will now absorb further volumes of the odiferous mixed alkyl amines.

In like manner, when the absorbing material becomes saturated with sulphur-containing bodies such as emanate from onions, garlic, decaying eggs or the like, union with formic aldehyde reduces these odiferous compounds to elementary sulphur and odorless chemical bodies and the absorbing material will now take up further volumes of odiferous vapors or gases.

For the sake of a concrete example illustrating one way in which may novel absorption apparatus may be manufactured in an especially desirable form, details of a specific procedure, within the scope of this broad invention, will now be set forth. It is understood, however, that the invention is not limited to the precise details described but may be varied within the scope of the appended claims in which the invention is more clearly pointed out.

As a specific example, we may take sour cherry charcoal 45%, coconut charcoal 25%, boxwood charcoal 20% and trioxymethylene 10%, all in granular form. This mixture is placed in a rotating cylinder or barrel, provided with agitating apparatus, and stirred for ten minutes or until a homogeneous product of uniform composition is obtained. The granules are then sieved to remove any pulverant material, and the mixture is then poured into a cylindrical container of perforated sheet metal, the perforations being of such size as to freely admit air, gases and vapors but too small to permit egress of the granular particles of carbon and trioxymethylene.

In the foregoing trioxymethylene is used as a gas forming material as it yields formic aldehyde, at ordinary temperatures, according to the following equation:

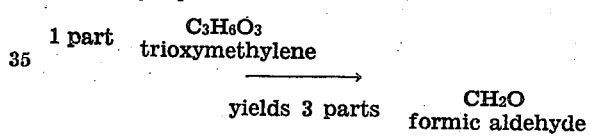

$$1 \text{ part } \underset{\text{trioxymethylene}}{C_3H_6O_3} \longrightarrow \text{yields 3 parts } \underset{\text{formic aldehyde}}{CH_2O}$$

In my novel apparatus an excess of trioxymethylene is used, the excess formic aldehyde tending to inhibit the development of bacterial growths; in this manner, combined purification and sterilization is attained. When proportioned as above set forth, this mixture releases formic aldehyde at atmospheric temperatures over prolonged periods.

In the foregoing I have used sour cherry, coconut and boxwood carbon or charcoal and trioxymethylene in granular form, however, pulverant materials may be used with equally good results or, a central core of molten trioxymethylene may be used around which is disposed the gas absorbing materials, all of which may then be enclosed in a pervious container, a perforated cylinder of sheet aluminum approximately 3 inches tall and 2½ inches in diameter being one form in which I prefer to manufacture this apparatus. Such a receptacle has a capacity of approximately 105 grams and will contain:

| | Grams |
|---|---|
| Sour cherry wood charcoal | 47.25 |
| Coconut shell charcoal | 26.25 |
| Boxwood charcoal | 21.00 |
| Trioxymethylene | 10.00 |

In the foregoing, I prefer to use pulverant trioxymethylene which is packed in a thimble or capsule of unsized paper. This capsule forms a central core about which is packed the granular absorbent material. I do not wish to confine myself to the size or shape of the container, the shape and size mentioned merely being one form suitable for use in a refrigerator having a capacity of approximately 3 cubic feet.

Another form in which my improved product may be manufactured is as follows:

| | Per cent |
|---|---|
| Sour cherry wood charcoal | 45 |
| Coconut shell charcoal | 25 |
| Boxwood charcoal | 20 |
| Trioxymethylene | 10 |

These materials are mixed to a stiff paste with ox blood, diluted with 10 volumes of water, and the mass is charred in suitable molds at 600° C. so as to form cakes or blocks which are available for use without the necessity of a containing receptacle.

In the foregoing I have used mixtures of charcoals with trioxymethylene, using ox blood as a binder; but I do not wish to confine myself to these particular materials as other absorbents such as silica gel, pumice, bonechar and other absorbents are equally available; nor do I wish to limit my invention to the use of trioxymethylene as other bodies capable of releasing gases, such as sodium peroxide, may be used with good results. Obviously, almost any adhesive may be used as a binder in lieu of the ox blood.

My improved product is a grayish black amorphous powder having a slightly brackish taste and a faint odor suggestive of formic aldehyde. For use as a deodorizer it may be made up into cakes or blocks as indicated above, or enclosed in a pervious container if preferred.

I am aware that numerous details of this process may be varied through a wide range, without departing from the spirit of this invention, and do not desire limiting the patent granted otherwise than is necessitated by the prior art.

I claim as my invention:

1. A gas absorption apparatus comprising sour cherry wood charcoal 45%, coconut shell charcoal 25%, boxwood charcoal 20%, trioxymethylene 10% and enclosed in a permeable container.

2. A gas absorption apparatus comprising a mixture of adsorbents and trioxymethylene.

3. A process of deodorizing refrigerators whereunder absorbed gases or odors are desorbed by the gases emanated from trioxymethylene.

4. A deodorizing composition comprising absorbent carbon containing substantial and effective quantities of absorbed formic aldehyde.

5. A deodorizing compound comprising an adsorbent and substantial and effective quantities of absorbed formic aldehyde.

DAVID JULIAN BLOCK.